United States Patent
Takasaki (10) Patent No.: US 10,615,382 B2
(45) Date of Patent: Apr. 7, 2020

(54) CELL MODULE

(71) Applicant: Panasonic Intellectual Property Management Co., Ltd., Osaka (JP)

(72) Inventor: Hiroshi Takasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 24 days.

(21) Appl. No.: 15/739,189

(22) PCT Filed: Sep. 8, 2016

(86) PCT No.: PCT/JP2016/004095
§ 371 (c)(1),
(2) Date: Dec. 22, 2017

(87) PCT Pub. No.: WO2017/056407
PCT Pub. Date: Apr. 6, 2017

(65) Prior Publication Data
US 2018/0375071 A1  Dec. 27, 2018

(30) Foreign Application Priority Data
Sep. 30, 2015 (JP) .................. 2015-192710

(51) Int. Cl.
*H01M 2/10* (2006.01)
*H01M 2/02* (2006.01)
(Continued)

(52) U.S. Cl.
CPC ............. *H01M 2/10* (2013.01); *H01M 2/021* (2013.01); *H01M 2/1061* (2013.01);
(Continued)

(58) Field of Classification Search
None
See application file for complete search history.

(56) References Cited

U.S. PATENT DOCUMENTS

2008/0171259 A1* 7/2008 Kanai ............... H01G 9/016
429/53
2014/0141308 A1* 5/2014 Christian ........... H01M 2/1016
429/99
(Continued)

FOREIGN PATENT DOCUMENTS

JP  11-176400 A  7/1999
JP  2012-138315  7/2012
(Continued)

OTHER PUBLICATIONS

International Search Report of PCT application No. PCT/JP2016/004095 dated Nov. 8, 2016.

*Primary Examiner* — Scott J. Chmielecki
(74) *Attorney, Agent, or Firm* — McDermott Will & Emery LLP (57) ABSTRACT

A cell module includes unit cells and holders. Each unit cell has an outer casing configured of two laminate films and including a housing portion that houses a power generating element and a sealing portion formed around the housing portion. Each holder includes a frame-shaped base portion disposed on the sealing portion, and an extension portion extending from the base portion onto the housing portion, and pressing a main surface portion at a position separated from a curved surface portion formed between a side surface portions and the main surface portion that are substantially perpendicular to each other of the housing portion. A plurality of unit cells is stacked on each other with the holders.

7 Claims, 5 Drawing Sheets

(51) Int. Cl.
*H01M 10/0585* (2010.01)
*H01M 10/0525* (2010.01)

(52) U.S. Cl.
CPC ...... *H01M 10/0585* (2013.01); *H01M 2/1077* (2013.01); *H01M 10/0525* (2013.01)

(56) References Cited

U.S. PATENT DOCUMENTS

| | | | | |
|---|---|---|---|---|
| 2015/0093608 | A1* | 4/2015 | Seong | H01M 2/0267 |
| | | | | 429/56 |
| 2016/0254504 | A1* | 9/2016 | Kim | H01M 2/1061 |
| | | | | 429/99 |
| 2017/0047620 | A1* | 2/2017 | Lee | H01M 2/1077 |
| 2017/0125774 | A1* | 5/2017 | Choi | H01M 2/1077 |
| 2017/0294634 | A1* | 10/2017 | Choi | H01M 10/6555 |

FOREIGN PATENT DOCUMENTS

| | | |
|---|---|---|
| JP | 5390580 B | 1/2014 |
| WO | 2005/096412 | 10/2005 |

\* cited by examiner

CELL MODULE

This application is a U.S. national stage application of the PCT International Application No. PCT/JP2016/004095 filed on Sep. 8, 2016, which claims the benefit of foreign priority of Japanese patent application 2015-192710 filed on Sep. 30, 2015, the contents all of which are incorporated herein by reference.

TECHNICAL FIELD

The present disclosure relates to a cell module.

BACKGROUND ART

Conventionally, a cell module in which a plurality of unit cells is stacked on each other with a holder interposed therebetween has been known (see, for example, Patent Literature 1). Patent Literature 1 discloses a cell module including a plurality of so-called laminate-type cells stacked on each other. In the cell module, the cells are restrained by sandwiching a sealing portion formed around a power-generating element housing portion of a cell outer casing through a holder.

CITATION LIST

Patent Literature

PTL 1: Japanese Patent No. 5390580

SUMMARY OF THE INVENTION

Technical Problem

When unit cells are sandwiched only at a sealing portion of a cell outer casing as in a cell module disclosed in PTL 1, vibration resistance and impact resistance are poor particularly in the direction in which unit cells are stacked. Thus, a method of fixing unit cells by pressing a power-generating element housing portion of a cell outer casing is considered. However, the power-generating element housing portion has lower rigidity than the sealing portion, and has a volume that is changed by charging and discharging. Therefore, when the housing portion is easily pressed, the outer casing may break.

Solution to Problem

A cell module according to the present disclosure includes:

a plurality of unit cells, each having an outer casing configured of two laminate films, and including a housing portion that houses a power generating element, and a sealing portion that is formed around the housing portion; and at least one holder including a frame-shaped base portion disposed on the sealing portion, and an extension portion that extends from the base portion onto the housing portion and presses a main surface portion at a position separated from a curved surface portion formed between a side surface portion and the main surface portion that are substantially perpendicular to each other of the housing portion. The plurality of unit cells is stacked on each other with the at least one holder.

Advantageous Effect of Invention

A cell module according to the present disclosure can stably maintain a state in which unit cells are stacked on each other without damaging an outer casing of the unit cell. The cell module according to the present disclosure is more excellent in vibration resistance and impact resistance as compared with a conventional module.

DESCRIPTION OF EMBODIMENTS

Hereinafter, one example of the first exemplary embodiment is described in detail.

The drawings referred to in the description of the exemplary embodiments are schematically illustrated. For example, the dimensional ratio of an element illustrated in the drawings may be different from that of the actual element. The specific dimensional ratio or the like should be determined in consideration of the following description. Description of "substantially . . . " in this specification is intended to include not only "completely perpendicular" but also "substantially perpendicular", when "substantially perpendicular" is taken as an example.

Figure 1:
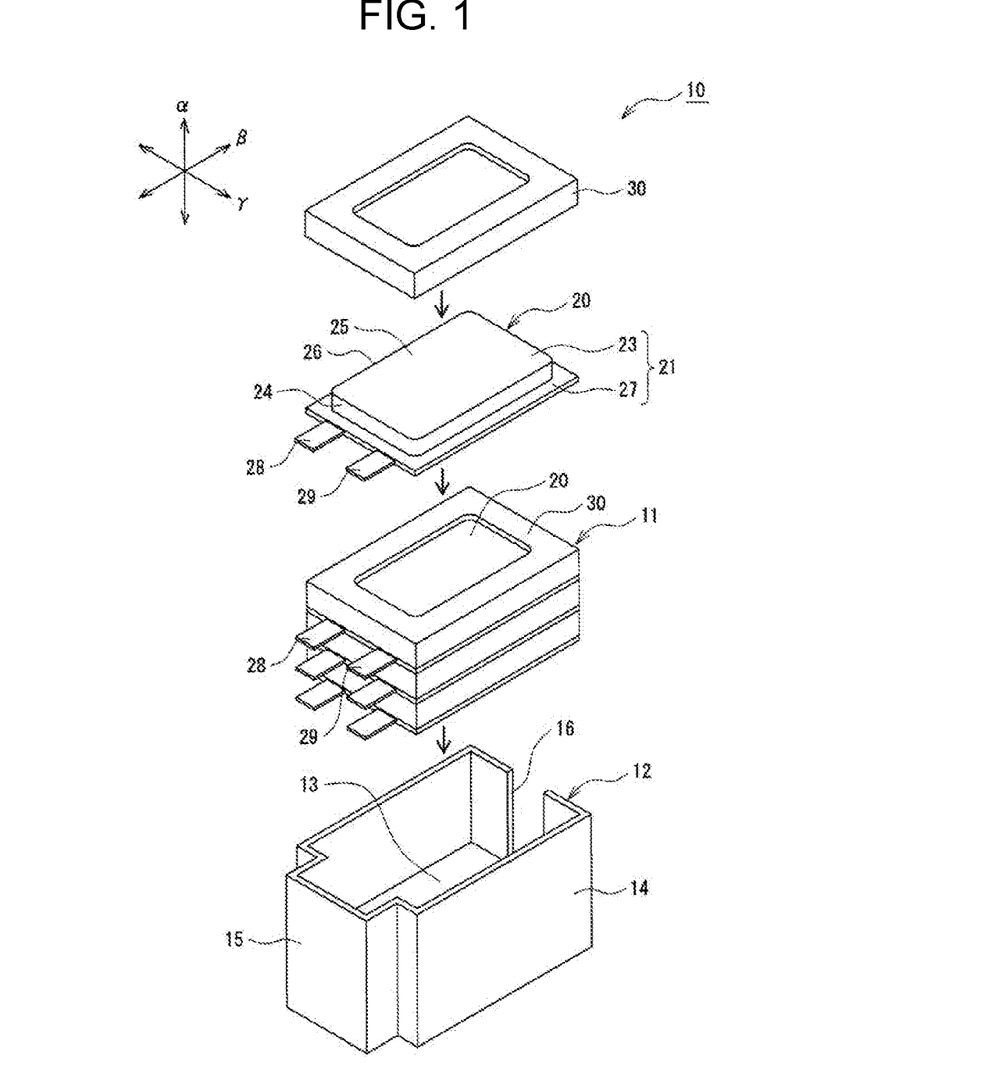
FIG. 1 is an exploded perspective view of a cell module in accordance with a first exemplary embodiment.
Figure 2:
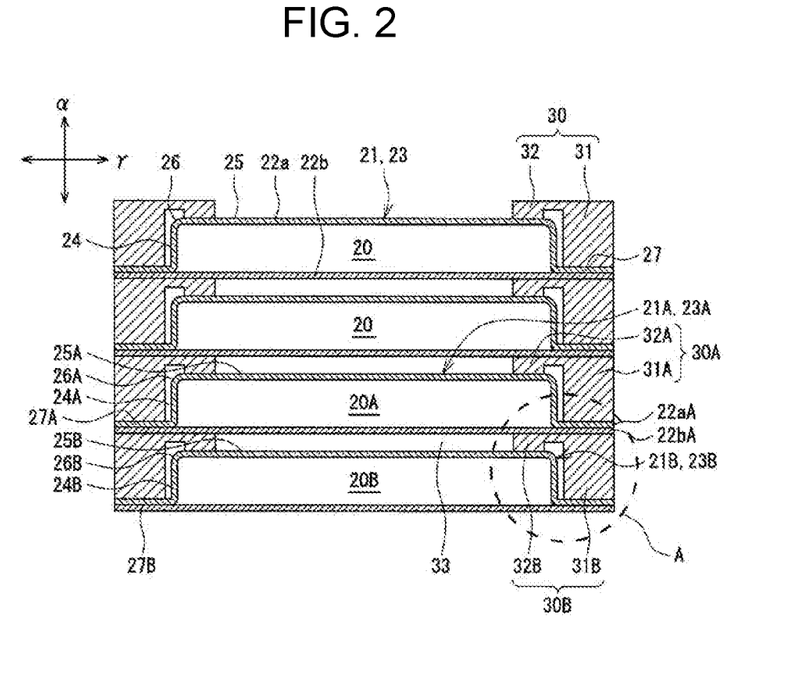
FIG. 2 is a sectional view of the cell module in accordance with the first exemplary embodiment.
Figure 3:
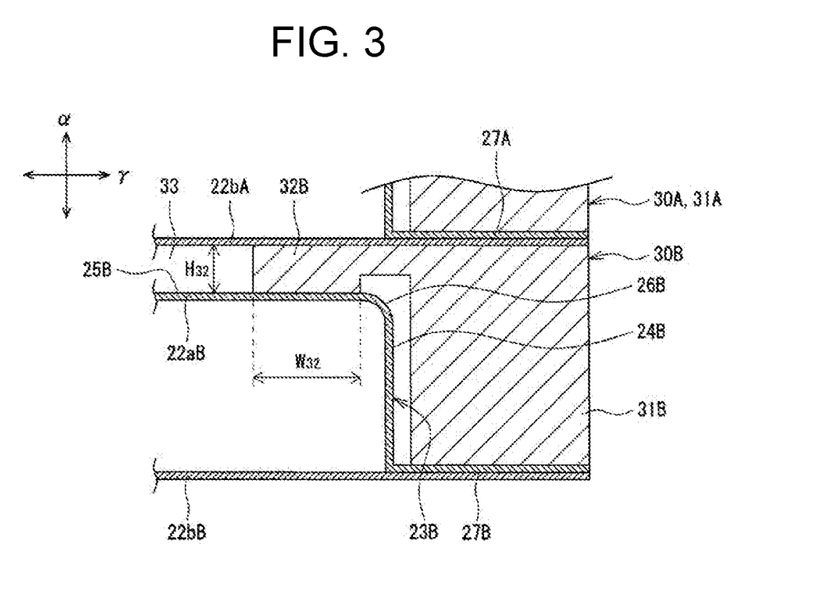
FIG. 3 is an enlarged view of a part A of FIG. 2.

Hereinafter, cell module 10 of a first exemplary embodiment is described in detail with reference to FIGS. 1 to 3. FIG. 1 is an exploded perspective view of cell module 10. FIG. 2 is a sectional view of cell module 10, and FIG. 3 is an enlarged view of a part A of FIG. 2. Hereinafter, a direction in which unit cells 20 are stacked (a stacked direction) is defined as a "vertical direction $\alpha$". Furthermore, laminate film 22a is disposed in the upper part with respect to laminate film 22b. Furthermore, as terms showing directions, a "front-and-back direction $\beta$" and a "lateral direction $\gamma$" are used.

As shown in FIG. 1, cell module 10 includes a plurality of unit cells 20 and a plurality of holders 30. Each unit cell 20 is a so-called laminate-type cell having outer casing 21 configured of two laminate films 22a and 22b. One suitable example of unit cell 20 is a lithium ion battery, including an electrode body and a nonaqueous electrolyte as power generating elements. The electrode body may be a stacked type in which a plurality of positive electrodes and negative electrodes are alternately stacked with separators interposed therebetween, or may be a wound type in which a positive electrode and a negative electrode are wound with a separator interposed therebetween. The nonaqueous electrolyte contains a non-aqueous solvent and an electrolyte salt dissolved in the non-aqueous solvent. The nonaqueous electrolyte is not necessarily limited to a liquid electrolyte, and may be a solid electrolyte using a gel-like polymer and the like. The electrolyte salt is preferably a lithium salt.

Cell module 10 includes cell stack 11 in which a plurality of unit cells 20 is stacked with holders 30 respectively interposed between unit cells 20. Cell stack 11 is formed, for example, by stacking a plurality unit cells 20 and holders 30 alternately. Each holder 30 is interposed between unit cells 20 so as to maintain a state in which a plurality of unit cells 20 is stacked on each other (that is, a structure of cell stack 11), and enhances vibration resistance and impact resistance of cell stack 11 particularly in the vertical direction α. Cell module 10 may be configured of only cell stack 11, but generally include module case 12 for housing cell stack 11.

In an example shown in FIG. 1, holders 30 constituting cell stack 11 are not fixed, and, for example, housed in module case 12, so that movement in the front-and-back direction β and the lateral direction γ is restrained. Furthermore, holders 30 may be fixed to each other by using a fastening member (not shown). For example, linking portions which are fitted each other, may be provided at holders 30 disposed adjacent to each other. Furthermore, there may be provided a pair of end plates disposed at both sides in the vertical direction α of cell stack 11, and coupled to each other with the stack sandwiched therebetween.

Module case 12 includes bottom wall 13 and side wall 14 set up on bottom wall 13. The inside of the case has space capable of housing cell stack 11. Module case 12 is provided with projection 15 that is a part of side wall 14 extending outward. Projection 15 forms space for housing positive electrode lead 28 and negative electrode lead 29 led out from unit cell 20. Furthermore, module case 12 is provided with opening 16 for exhausting gas released from unit cell 20 at occurrence of abnormality such as internal short circuit. In an example shown in FIG. 1, projection 15 and opening 16 are formed to be arranged in the front-and-back direction β. Note here that it is preferable that module case 12 includes a lid (not shown).

Unit cell 20 has outer casing 21 formed of two laminate films 22a and 22b as mentioned above. As laminate films 22a and 22b, a film having resin layers on both surfaces of a metal layer is suitably used. It is preferable that one of the resin layers is formed of a thermocompression-bondable resin. A metal layer is, for example, an aluminum thin-film layer, and has a function of preventing permeation of moisture, and the like.

Outer casing 21 includes housing portion 23 housing the above-mentioned power generating element, and includes sealing portion 27 formed around housing portion 23. In this exemplary embodiment, laminate film 22a is molded in a cup shape. A flat and substantially rectangular parallelepiped housing portion 23 is formed on the film. Housing portion 23 is formed by, for example, subjecting laminate film 22a to drawing processing so as to project toward the opposite side to laminate film 22b that is disposed facing laminate film 22a. Laminate film 22b is substantially flat, and forms a lower surface of unit cell 20. Sealing portion 27 is formed, for example, by thermocompression-bonding peripheral edges of laminate films 22a and 22b to each other, and hermetically closes the inside space of housing portion 23 that houses the power generating element.

Housing portion 23 includes side surface portion 24 and main surface portion 25 which are substantially perpendicular to each other. In this exemplary embodiment, side surface portion 24 is formed substantially perpendicular to sealing portion 27 and is along the vertical direction α. Main surface portion 25 is formed substantially perpendicular to side surface portion 24 (vertical direction α) to form an upper surface of unit cell 20. Main surface portion 25 is disposed substantially parallel to laminate film 22b forming the lower surface of unit cell 20, and has a substantially rectangular shape elongated in the front-and-back direction β.

Housing portion 23 has curved surface portion 26 between side surface portion 24 and main surface portion 25. Curved surface portion 26 is curved toward the outside of housing portion 23, and provided so as to surround the periphery of main surface portion 25. Housing portion 23 is suitably formed by drawing processing as mentioned above. Curved surface portion 26 has less strength than main surface portion 25.

Unit cell 20 includes positive electrode lead 28 and negative electrode lead 29 led out from outer casing 21 as mentioned above (hereinafter, which is generically referred to as "electrode plate lead"). In the example shown in FIG. 1, each electrode plate lead is led out from one end in the longitudinal direction of outer casing 21. Each electrode plate lead is a substantially flat plate-like body, joined to laminate films 22a and 22b by sealing portion 27, and led out to the outside of outer casing 21 from between the films through sealing portion 27. Positive electrode lead 28 and negative electrode lead 29 are arranged in the vertical direction α, and connected in series by using, for example, bus bars (not shown). Electrode plate leads, bus bars, and the like, are housed in projection 15 of module case 12.

The positive electrode constituting unit cell 20 is configured of, for example, a positive electrode current collector and a positive electrode mixture layer formed on the electrode current collector. As the positive electrode current collector, a foil of metal such as aluminum that is stable in the potential range of the positive electrode, a film having a surface layer of the metal, or the like, can be used. Positive electrode lead 28 is electrically connected to the positive electrode current collector. It is suitable that the positive electrode mixture layer includes a conductive material and a binding material in addition to the positive electrode active material, and is formed on both surfaces of the electrode current collector. Examples of the positive electrode active material include lithium-containing composite oxide. Examples of suitable composite oxide include Ni—Co—Mn, Ni—Co—Al lithium-containing composite oxide.

The positive electrode constituting unit cell 20 is configured of, for example, a negative electrode current collector and a negative electrode mixture layer formed on the electrode current collector. As the negative electrode current collector, a foil of metal such as copper that is stable in the potential range of the negative electrode, a film having a surface layer of the metal, or the like, can be used. Negative electrode lead 29 is electrically connected to the negative electrode current collector. It is suitable that the negative electrode mixture layer includes a conductive material and a binding material in addition to the negative electrode active material. Any negative electrode active materials may be used as long as it is capable of absorbing and releasing lithium ions. Graphite is generally used.

As shown in FIGS. 1 to 3, one holder 30 is provided for one unit cell 20. In this exemplary embodiment, four unit cells 20 and four holders 30 are alternately stacked on each other so as to form cell stack 11. In the following description, unit cell 20 disposed at the third position from the top is defined as "unit cell 20A", and unit cell 20 disposed at the fourth position from the top (at the bottom) is defined as "unit cell 20B" (see FIG. 2). Three unit cells excluding unit cell 20B are sandwiched from the upper and lower sides by two holders 30. Unit cell 20B is disposed on bottom wall 13 of module case 12, and sandwiched by bottom wall 13 and holder 30. Holder 30 has mechanical strength (rigidity) capable of stably supporting each unit cell 20. Holder 30 may be made of resin or metal.

Holder 30 includes base portion 31 disposed on sealing portion 27 of outer casing 21. Base portion 31 is formed in a frame shape along the sealing portion 27 that is formed around housing portion 23. In this exemplary embodiment, base portion 31 is provided in an annular shape around the surrounding of housing portion 23 such that base portion 31 does not protrude from sealing portion 27. A length in the vertical direction of base portion 31 is longer than a length in the vertical direction of housing portion 23. The upper end of base portion 31 protrudes to the upper side from main surface portion 25 of housing portion 23. Sealing portions 27 of three unit cells 20 excluding unit cell 20B are sandwiched from the upper and lower sides by base portions 31 of two holders 30, respectively.

It is preferable that base portion 31 has a cut-away (not shown), by cutting a part abutting against sealing portion 27, at the other end side in the longitudinal direction of unit cell 20, that is, an opposite side to the side from which the electrode plate leads are led out. When base portion 31 is provided with the cut-away, a part of sealing portion 27 is not sandwiched from the upper and lower sides, the part breaks at occurrence of abnormality such as internal short circuit, and gas is released.

Holder 30 includes extension portion 32 that extends from base portion 31 onto housing portion 23. Extension portion 32 presses main surface portion 25 at a position separated from curved surface portion 26 of housing portion 23. When holder 30 presses main surface portion 25 of housing portion 23 in addition to sealing portion 27, a restraining force of unit cell 20 in the vertical direction α is enhanced to improve vibration resistance and impact resistance. Furthermore, as mentioned above, since curved surface portion 26 has less strength than main surface portion 25, when extension portion 32 presses main surface portion 25 without being brought into contact with curved surface portion 26, housing portion 23 can be prevented from being broken.

It is suitable that extension portion 32 extends from the upper end of base portion 31 to the inner side of base portion 31. That is, the upper surface of holder 30 is substantially flat without having a step difference between base portion 31 and extension portion 32. A gap is provided between extension portion 32 and curved surface portion 26. Extension portion 32 protrudes to a main surface portion 25 side (downward) at a position separated from curved surface portion 26. In this exemplary embodiment, extension portion 32 has a substantially L-shaped cross-section. Thus, extension portion 32 can press main surface portion 25 without being brought into contact with curved surface portion 26. Note here that base portion 31 is not brought into contact with side surface portion 24 of housing portion 23, and a gap is provided between base portion 31 and side surface portion 24.

Extension portion 32 may extend toward the inner side of base portion 31 so as to cover the entire region of main surface portion 25 and abut against a substantially entire region of main surface portion 25, but preferably abuts against only an edge of main surface portion 25 adjacent to curved surface portion 26. Note here that extension portion 32 does not abut against the edge of main surface portion 25 that is an interface position between main surface portion 25 and curved surface portion 26. Herein, the edge of main surface portion 25 means a range of up to about 10% of a width (length in the short-side direction) of surface portion 25 from the edge of main surface portion 25.

It is preferable that extension portion 32 presses edges along at least two facing sides of main surface portion 25. In this exemplary embodiment, extension portion 32 is formed in a frame shape and abuts against a peripheral edge of main surface portion 25. That is to say, extension portion 32 is formed in an annular shape along the inner edge of base portion 31. In order to stably support unit cell 20, it is suitable to support a portion near the end portion of unit cell 20. Therefore, when the edge of main surface portion 25 is pressed, the vibration resistance and impact resistance are improved. Furthermore, when only the edge of main surface portion 25 is suppressed, it is possible to form gap 33 capable of absorbing a volume increase of housing portion 23 due to charging and discharging, between two unit cells 20 disposed adjacent to each other.

In the case of unit cell 20A, sealing portion 27A is sandwiched from the upper and lower sides by base portion 31A of holder 30A disposed on the sealing portion 27A and base portion 31B of holder 30B disposed on sealing portion 27B of unit cell 20B. Further, the peripheral edge of main surface portion 25A of housing portion 23A is pressed from the upper side by extension portion 32A of holder 30A, and laminate film 22bA forming the lower surface of unit cell 20A is supported from the lower side by extension portion 32B of holder 30B. Furthermore, holder 30B provides gap 33 for absorbing a volume increase of housing portion 23B, between unit cells 20A and 20B.

In extension portion 32B of holder 30B, a width $W_{32}$ (a length in the lateral direction) of a portion abutting against main surface portion 25B of housing portion 23B may be, for example, about 3% to 25% of a width (a length in the lateral direction) of main surface portion 25B, but it is preferably 3% to 10%. Extension portion 32B abuts against main surface portion 25B, for example, at an inner side of main surface portion 25B from a position that is distant by 0.5 mm to 5 mm from an edge of main surface portion 25B. A length $H_{32}$ in the vertical direction of extension portion 32B, that is, a length in the vertical direction of gap 33 is a length in which housing portion 23B is not brought into contact with the lower surface of unit cell 20A when housing portion 23B is most swollen. When laminate film 22bA of unit cell 20A is expanded downward, the length $H_{32}$ is set in consideration of such expansion. Herein, various dimensions are described with holder 30B taken as an example, but the same is true to the other holders 30.

According to cell module 10 having the above-mentioned configuration, since holder 30 presses an edge of main surface portion 25 in a state in which holder 30 is not brought into contact with curved surface portion 26 of housing portion 23, a state in which unit cells 20 are stacked can be stably maintained without damaging outer casing 21. Cell module 10 has more excellent vibration resistance and impact resistance in the vertical direction α as compared with a conventional cell module in which only sealing portion 27 is sandwiched.

Figure 4:
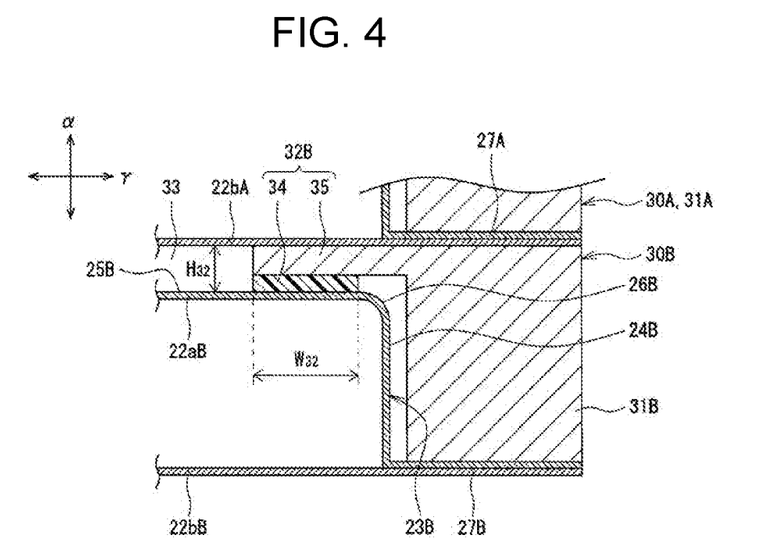
FIG. 4 is a view showing a modified example of the first exemplary embodiment.
Figure 5:
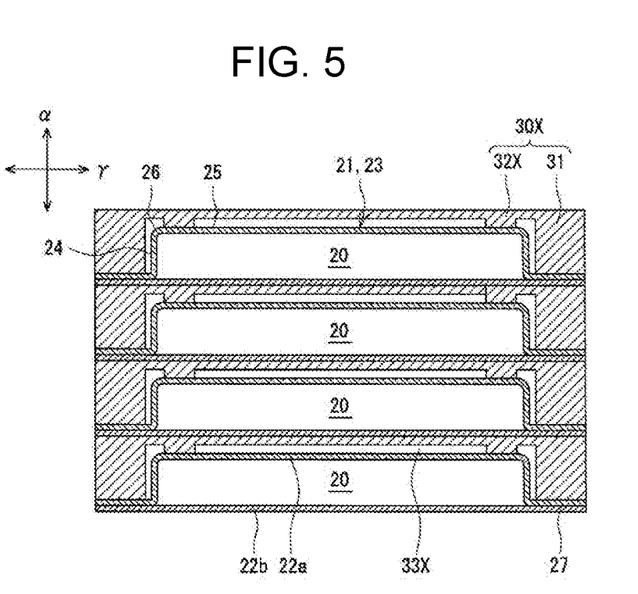
FIG. 5 is a view showing a modified example of the first exemplary embodiment.
Figure 6A:
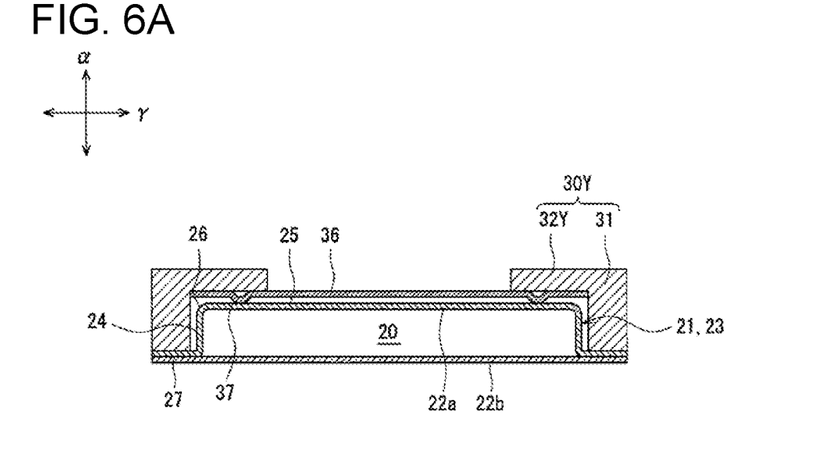
FIG. 6A is a view showing a modified example of the first exemplary embodiment.
Figure 6B:
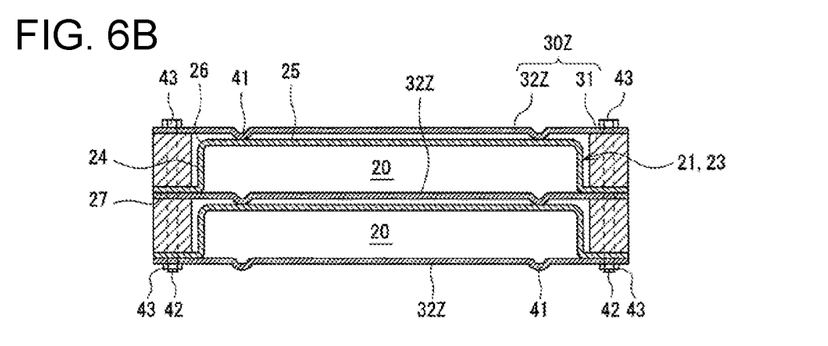
FIG. 6B is a view showing another modified example of the first exemplary embodiment.

FIGS. 4 to 6 show modified examples of the first exemplary embodiment. FIG. 6(A) shows only one unit cell 20. Also, in this case, a plurality of unit cells 20 and a plurality of holders 30 are alternately stacked on each other to form a cell module.

In an example shown in FIG. 4, elastic member 34 having cushion property is provided on a portion in which extension portion 32B abuts against main surface portion 25B. When a volume of housing portion 23B is increased by charging and discharging, elastic member 34 is elastically deformed to absorb such an increase in the volume. Examples of suitable elastic member 34 include a foam body, a rubber member, and the like. The entire part of extension portion 32B may be formed of elastic member 34, but preferably highly rigid support portion 35 is provided in a portion in which extension portion 32B abuts against unit cell 20B. In an example shown in FIG. 4, support portion 35 extends inward from the upper end of base portion 31B with a gap provided between support portion 35 and main surface portion 25B. Elastic member 34 is attached to the lower surface of support portion 35, and presses main surface portion 25 at a position separated from curved surface portion 26 of housing portion 23.

In holder 30X shown in FIG. 5, extension portion 32X extending from base portion 31 onto housing portion 23 covers the entire region of main surface portion 25. In this case, extension portion 32X may abut against a substantially entire region of main surface portion 25 at a position separated from curved surface portion 26, but preferably abuts against only an edge of main surface portion 25 adjacent to curved surface portion 26. It is particularly preferable that extension portion 32X abuts against the peripheral edge of main surface portion 25. In the example shown in FIG. 5, gap 33X is formed between extension portion 32X and main surface portion 25. Holder 30X is brought into contact with the lower surface of unit cell 20, which is disposed on holder 30X, without a gap.

Holder 30Y shown in FIG. 6(A) includes metal plate 36 disposed between extension portion 32Y and main surface portion 25 of housing portion 23. Metal plate 36 covers a substantially entire region of main surface portion 25 and presses main surface portion 25 at a position separated from curved surface portion 26. Metal plate 36 is formed of, for example, metal including aluminum, and functions as a partition for suppressing fire spreading. Metal plate 36 has a substantially rectangular shape that is longer in, for example, the front-and-back direction β. Metal plate 36 is provided with protrusions 37 protruding downward along the longitudinal direction. In the example shown in FIG. 6(A), extension portion 32Y presses main surface portion 25 via metal plate 36. In this case, protrusion 37 of metal plate 36 presses an edge along the facing two sides of main surface portion 25.

In holder 30Z shown in FIG. 6(B), base portion 31 and extension portion 32Z are formed separately. Extension portion 32Z is made of a metal plate. The metal plate is disposed on base portion 31 so as to cover the entire region of main surface portion 25, and stacked such that it is interposed between unit cells 20. For example, metal bar 42 is allowed to penetrate through a part in which base portion 31 and the metal plate of holder 30 are stacked with sealing portion 27 sandwiched therebetween, and nuts 43 are fastened to screw portions formed on both ends of metal bar 42. Thus, a plurality of holders 30Z and a plurality of unit cells 20 are fixed in a state in which they are stacked on each other. Each metal plate includes protrusion 41 for pressing main surface portion 25. Main surface portion 25 is pressed by protrusion 41 at a position separated from curved surface portion 26.

Figure 7:
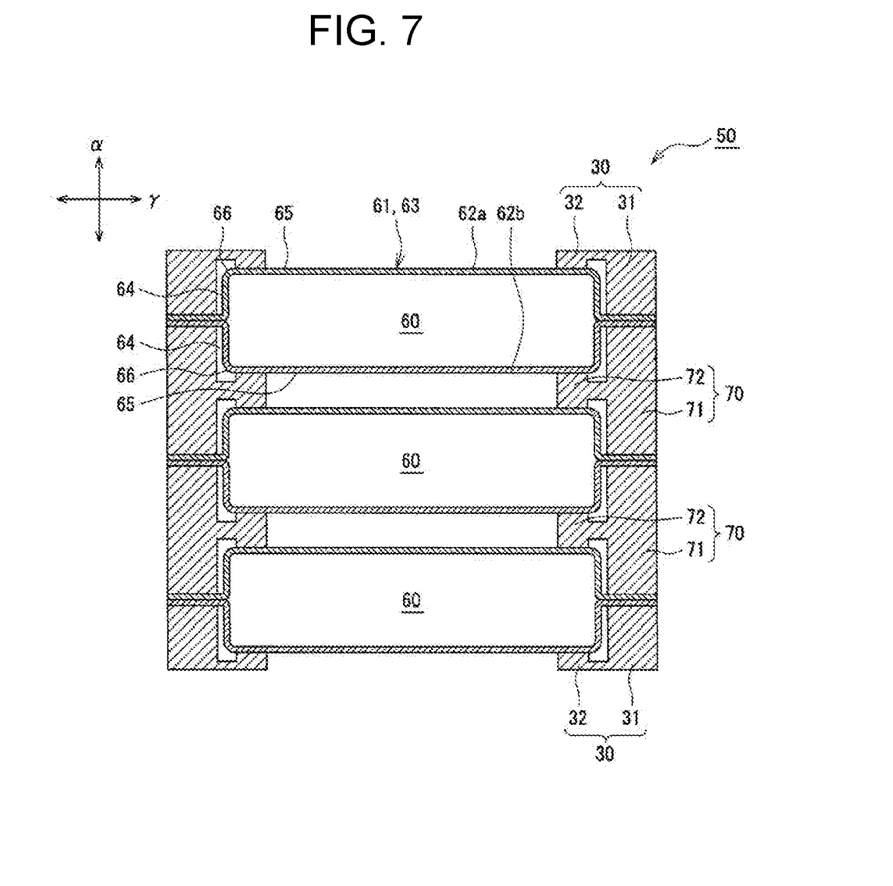
FIG. 7 is a sectional view of a cell module of a second exemplary embodiment.

FIG. 7 is a sectional view of cell module 50 of a second exemplary embodiment.

Cell module 50 is different from cell module 10 in that in cell module 50, laminate films 62a and 62b constituting outer casing 61 of unit cell 60 expand in the opposite directions so as to form housing portion 63, while in cell module 10, only laminate film 22a is subjected to drawing processing so as to form housing portion 23. Housing portion 63 is formed by subjecting laminate films 62a and 62b to drawing processing. Not on only laminate film 62a but also on laminate film 62b, that is, on the upper and lower parts of outer casing 61, side surface portion 64, main surface portion 65, and curved surface portion 66 are formed. Side surface portion 64 and main surface portion 65 are substantially perpendicular to each other. Curved surface portion 66 curving outward is formed between side surface portion 64 and main surface portion 65.

In the example shown in FIG. 7, three unit cells 60 are held by holders 30 and 70. Two each of holders 30 and 70, four holders in total, are provided. One of the two holders 30 is provided to unit cell 60 disposed on the top, and the other holder is provided to unit cell 60 disposed on the bottom. Holder 70 is provided between two unit cells 60. Similar to holder 30, holder 70 includes frame-shaped base portion 71 disposed on sealing portion 67, and extension portion 72 extending toward the inner side of base portion 71. Extension portion 72 presses main surface portion 65 at a position separated from curved surface portion 66. It is preferable that holder 70 abuts against a peripheral edge of main surface portion 65, and gap 73 is formed between two unit cells 60. The configuration described for holder 30 can be applied to holder 70.

Base portion 71 abuts against sealing portion 66 of two unit cells 60. Extension portion 72 extends inward from the center in the vertical direction of base portion 71 and is formed to have a substantially T-shaped section. Extension portion 72 presses each main surface portion 25 of two unit cells 60 without being brought into contact with curved surface portion 66.

The invention claimed is:

1. A cell module comprising:
   a plurality of unit cells, each having an outer casing configured of two laminate films, and including a housing portion that houses a power generating element, and a sealing portion that is formed around the housing portion; and
   at least one holder including a frame-shaped base portion disposed on the sealing portion, and an extension portion that extends from the base portion onto the housing portion and presses a main surface portion at a position separated from a curved surface portion formed between a side surface portion and the main surface portion that are substantially perpendicular to each other of the housing portion,
   wherein the plurality of unit cells is stacked on each other with the at least one holder,
   the extension portion of the holder includes a facing surface which faces the curved surface portion and a contacting surface which contacts the main surface, and
   the facing surface is farther than the contacting surface from the main surface in a direction perpendicular to the main surface.

2. The cell module according to claim 1, wherein the extension portion of the holder abuts against edges along at least facing two sides of the main surface portion among edges of the main surface adjacent to the curved portion of the housing portion so as to form a gap between two of the unit cells disposed adjacent to each other.

3. The cell module according to claim 2, wherein the extension portion of the holder abuts against a peripheral edge of the main surface portion and is formed in a frame shape.

4. A cell module comprising:
   a plurality of unit cells, each having an outer casing configured of two laminate films, and including a housing portion that houses a power generating element, and a sealing portion that is formed around the housing portion; and
   at least one holder including a frame-shaped base portion disposed on the sealing portion, and an extension portion that extends from the base portion onto the housing portion and presses a main surface portion at a position separated from a curved surface portion formed between a side surface portion and the main surface portion that are substantially perpendicular to each other of the housing portion, wherein:

the plurality of unit cells is stacked on each other with the at least one holder, the holder includes a metal plate disposed between the extension portion and the main surface portion of the housing portion, covering a substantially entire region of the main surface portion, and pressing the main surface portion at the position separated from the curved surface portion, and the extension portion presses the main surface portion via the metal plate.

5. The cell module according to claim 1, wherein the housing portion of each of the unit cells is formed of the laminate films expanding in opposite directions, and the extension portion of the holder presses the main surface portions of two of the unit cells disposed adjacent to each other.

6. A cell module comprising:

a plurality of unit cells, each having an outer casing configured of two laminate films, and including a housing portion that houses a power generating element, and a sealing portion that is formed around the housing portion; and at least one holder including a frame-shaped base portion disposed on the sealing portion, and an extension portion that extends from the base portion onto the housing portion and presses a main surface portion at a position separated from a curved surface portion formed between a side surface portion and the main surface portion that are substantially perpendicular to each other of the housing portion, wherein:

the plurality of unit cells is stacked on each other with the at least one holder, the extension portion of the holder is configured of a metal plate covering an entire region of the main surface portion, and the metal plate is interposed between the unit cells, and has a protrusion that presses the main surface portion at the position separated from the curved surface portion.

7. The cell module according to claim 1, wherein the extension portion is spaced apart from a center portion of the main surface portion.

* * * * *